US009877202B2

(12) United States Patent
Freda et al.

(10) Patent No.: US 9,877,202 B2
(45) Date of Patent: Jan. 23, 2018

(54) METHOD AND PROCEDURE FOR COMMUNICATION BETWEEN DATABASES OR SPECTRUM MANAGEMENT FUNCTIONS

(71) Applicant: INTERDIGITAL PATENT HOLDINGS, INC., Wilmington, DE (US)

(72) Inventors: Martino M. Freda, Laval (CA); Pekka Ojanen, Espoo (FI)

(73) Assignee: InterDigital Patent Holdings, Inc., Wilmington, DE (US)

(*) Notice: Subject to any disclaimer, the term of this patent is extended or adjusted under 35 U.S.C. 154(b) by 0 days.

(21) Appl. No.: 15/028,361

(22) PCT Filed: Oct. 8, 2014

(86) PCT No.: PCT/US2014/059731
§ 371 (c)(1),
(2) Date: Apr. 8, 2016

(87) PCT Pub. No.: WO2015/054408
PCT Pub. Date: Apr. 16, 2015

(65) Prior Publication Data
US 2016/0262024 A1 Sep. 8, 2016

Related U.S. Application Data

(60) Provisional application No. 61/888,362, filed on Oct. 8, 2013.

(51) Int. Cl.
*H04W 16/14* (2009.01)
*H04W 72/04* (2009.01)

(52) U.S. Cl.
CPC ....... *H04W 16/14* (2013.01); *H04W 72/0453* (2013.01)

(58) Field of Classification Search
CPC .................................................... H04W 16/14
See application file for complete search history.

(56) References Cited

U.S. PATENT DOCUMENTS

2010/0304678 A1* 12/2010 Chandra ............... H04W 16/14
455/62
2011/0087639 A1   4/2011 Gurney
(Continued)

FOREIGN PATENT DOCUMENTS

WO   2012/048090   4/2012
WO   2012/076192   6/2012
(Continued)

OTHER PUBLICATIONS

Cisco, "Cisco Visual Networking Index: Global Mobile Data Traffic Forecast Update, 2011-2016," (Feb. 14, 2012).
(Continued)

*Primary Examiner* — Christopher M Brandt
(74) *Attorney, Agent, or Firm* — Volpe and Koenig, P.C.

(57) ABSTRACT

Methods and apparatuses are described herein for providing a victim database discovery procedure. The victim database discovery procedure may be guided by an initial list of potential victim databases that may be defined by physical properties such as the geographic or regional relationships of the areas that may be protected by each database. Exchange procedures are disclosed in which incumbent information between two databases is exchanged. Also described herein are exchanges of information between databases whereby a querying database may receive restrictions on associated operating parameters of Cognitive Radio Systems (CRSs) under their control in an area. Further, a procedure is described herein by which a database that receives a request for shared spectrum from a CRS may first forward the request to a neighboring or victim database to determine the
(Continued)

allowable channels and then may make the actual allocation based on this information and its own incumbents.

20 Claims, 13 Drawing Sheets

(56) References Cited

U.S. PATENT DOCUMENTS

| | | | |
|---|---|---|---|
| 2011/0098027 A1 | 4/2011 | Rajasimman et al. | |
| 2012/0094681 A1* | 4/2012 | Freda .................... | H04W 72/02 455/452.1 |
| 2014/0135048 A1* | 5/2014 | Kasslin ................ | H04W 16/14 455/501 |
| 2015/0111596 A1* | 4/2015 | Ruuska ................ | H04W 16/14 455/454 |

FOREIGN PATENT DOCUMENTS

| | | |
|---|---|---|
| WO | 2013/126843 | 8/2013 |
| WO | 2014/117135 | 7/2014 |

OTHER PUBLICATIONS

European Commission Mandate M/512, "Standardization Mandate to CEN, CENELEC, and ETSI for Reconfigurable Radio Systems," (Nov. 2012).

European Commission, "Radio Spectrum Policy Group—RSPG Opinion on Licensed Shared aCCESS," RSPG13-538, (Nov. 2013).

European Telecommunications Standards Institute, "Reconfigurable Radio Systems (RRS); System requirements for Operation in UHF TV Band White Spaces," Draft ETSI TS 102 946 V0.0.18, (Jun. 2011).

European Telecommunications Standards Institute, "Reconfigurable Radio Systems (RRS); System requirements for Operation in UHF TV Band White Spaces," Draft ETSI TS 102 946 V0.0.20, (Jun. 2011).

European Telecommunications Standards Institute, "Reconfigurable Radio Systems (RRS); System requirements for Operation in UHF TV Band White Spaces," ETSI TS 102 946 V1.1.1, (Jul. 2014).

European Telecommunications Standards Institute, "Reconfigurable Radio Systems (RRS); System Architecture for WSD GLDBs," Draft TS 103 143 V0.0.3, (Dec. 2013).

European Telecommunications Standards Institute, "System Architecture and High Level Procedures for Coordinated and Uncoordinated Use of TV White Spaces," Draft TS 103 145 V0.0.3, (Aug. 2013).

Executive Office of the President—President's Council of Advisors on Science and Technology, "Report to the President—Realizing the Full Potential of Government-Held Spectrum to Spur Economic Growth," (Jul. 2012).

Federal Communications Commission, "Notice of Proposed Rulemaking and Order," FCC 12-148, (Dec. 12, 2012).

Goldman, "Spectrum Crunch: The Cell Phone Industry Hits Its Limits." CNNMoney. Cable News Network, (Feb. 21, 2012).

National Telecommunications and Information Administration, "An Assessment of the Viability of Accommodating Wireless Broadband in the 1755-1850 MHz Band," (Mar. 2012).

QUALCOMM, "Licensed Shared Access as complementary approach to meet spectrum demands: Benefits for the next generation cellular systems," presented at the ETSI workshop on Reconfigurable Radio Systems, (Dec. 12, 2012).

Radio Spectrum Policy Group 2011, "Report on Collective Use of Spectrum (CUS) and other spectrum sharing approaches," RSPG11-392 Final, (Nov. 2011).

The White House, "Presidential Memorandum: Unleashing the Wireless Broadband Revolution," (Jun. 28, 2010).

WIMAX Forum, "A Review of Spectrum Requirements for Mobile WiMAX Equipment to Support Wireless Personal Broadband Services," (Sep. 2007).

* cited by examiner

METHOD AND PROCEDURE FOR COMMUNICATION BETWEEN DATABASES OR SPECTRUM MANAGEMENT FUNCTIONS

CROSS REFERENCE TO RELATED APPLICATIONS

This application claims the benefit of U.S. Provisional Application Ser. No. 61/888,362 filed on Oct. 8, 2013, the contents of which are hereby incorporated by reference herein.

BACKGROUND

Over the last decade, the amount of wireless traffic has greatly increased, and devices such as smartphones and tablets have become ubiquitous. Due to the enhanced connectivity and the wide use of applications that require data transmission these devices and their applications may use significantly more spectrum than feature phones or standard mobile devices. Several studies predict tremendous worldwide growth in the market size of mobile broadband services. For instance, according to one study, the market may grow from 1 billion users as estimated in 2012 to as many as 8 billion users by 2015. In addition, global mobile data continues to double yearly and may continue to do so through 2016. Thus, more spectrum may be needed for mobile broadband use.

Traditionally, spectrum use has been based on exclusive utilization of dedicated bands, and additional spectrum for mobile broadband has been created by repurposing of spectrum (i.e. moving incumbents to other bands). This happened for example with the 2.5 GHz band in most parts of the world, and more recently with the clearing of parts of the UHF band due to the digital switchover, known as the Digital Dividend. With time, the practice of repurposing has become more difficult due to the nature of the incumbent services that would need to be moved to other bands. In particular, repurposing of existing services that are widely in use is an extremely costly and lengthy undertaking. As a result, regulators have begun to realize that methods other than repurposing may be used to obtain new spectrum to solve the bandwidth crunch. For example, most of the spectrum bands are not fully utilized, and portions of them may be available for other uses on a geographical or temporal basis.

SUMMARY

Methods and apparatuses are described herein for providing a victim database discovery procedure. The victim database discovery procedure may be guided by an initial list of potential victim databases. The initial list may be defined by physical properties such as the geographic or regional relationships of the areas that may be protected by each database. Exchange procedures are disclosed in which incumbent information between two databases is exchanged, whereby a querying database may request incumbent information from a victim database and may use the incumbent information in order to assign parameters to shared spectrum devices without harming the incumbents of the victim database. Also described herein are exchanges of information between databases whereby a querying database may receive restrictions on associated operating parameters of Cognitive Radio Systems (CRSs) under their control in an area. Further, a procedure is described herein by which a database that receives a request for shared spectrum from a CRS may first forward the request to a neighboring or victim database to determine the allowable channels with respect to the incumbents protected by that database and then may make the actual allocation of shared spectrum based on this information and information regarding its own incumbents.

BRIEF DESCRIPTION OF THE DRAWINGS

A more detailed understanding may be had from the following description, given by way of example in conjunction with the accompanying drawings wherein.

DETAILED DESCRIPTION

Figure 1A:
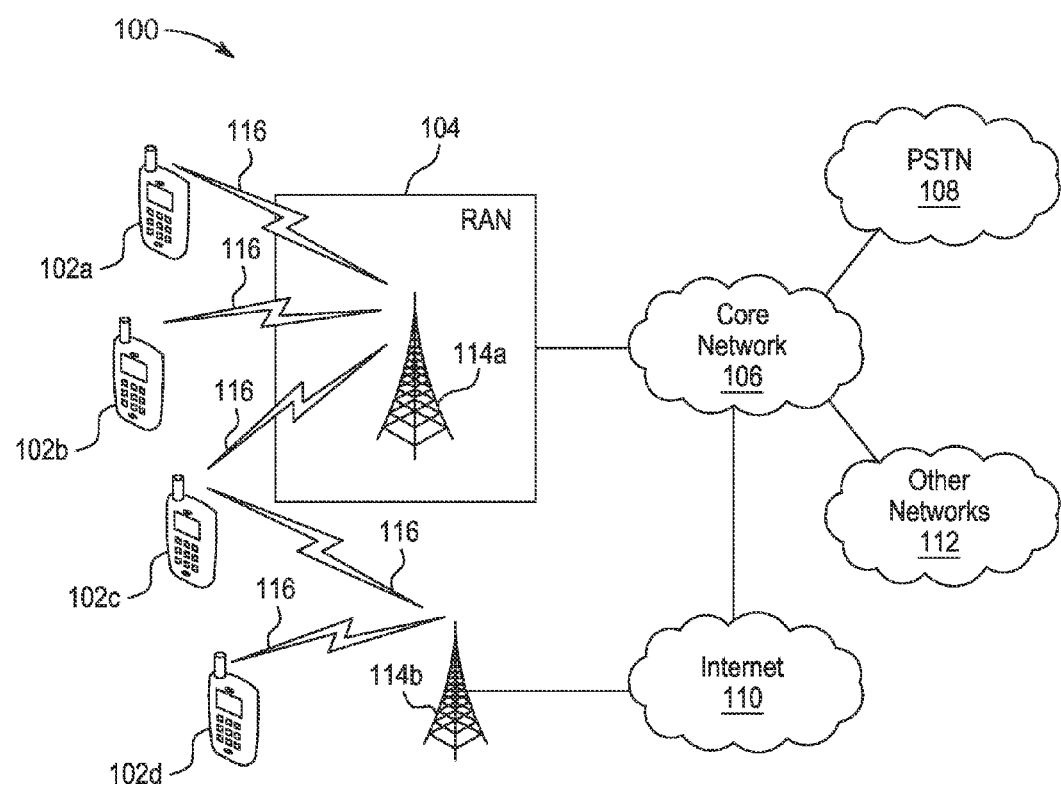
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102*d* may be any type of device configured to operate and/or communicate in a wireless environment. By way of example, the WTRUs 102*a*, 102*b*, 102*c*, 102*d* may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114*a* and a base station 114*b*. Each of the base stations 114*a*, 114*b* may be any type of device configured to wirelessly interface with at least one of the WTRUs 102*a*, 102*b*, 102*c*, 102*d* to facilitate access to one or more communication networks, such as the core network 106, the Internet 110, and/or the other networks 112. By way of example, the base stations 114*a*, 114*b* may be a base transceiver station (BTS), a Node-B, an eNode B, a Home Node B, a Home eNode B, a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 104, which may also include other base stations and/or network elements (not shown), such as a base station controller (BSC), a radio network controller (RNC), relay nodes, etc. The base station 114*a* and/or the base station 114*b* may be configured to transmit and/or receive wireless signals within a particular geographic region, which may be referred to as a cell (not shown). The cell may further be divided into cell sectors. For example, the cell associated with the base station 114*a* may be divided into three sectors. Thus, in one embodiment, the base station 114*a* may include three transceivers, i.e., one for each sector of the cell. In another embodiment, the base station 114*a* may employ multiple-input multiple-output (MIMO) technology and, therefore, may utilize multiple transceivers for each sector of the cell.

The base stations 114*a*, 114*b* may communicate with one or more of the WTRUs 102*a*, 102*b*, 102*c*, 102*d* over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 104 and the WTRUs 102*a*, 102*b*, 102*c* may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114*a* and the WTRUs 102*a*, 102*b*, 102*c* may implement radio technologies such as IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114*b* and the WTRUs 102*c*, 102*d* may implement a radio technology such as IEEE 802.11 to establish a wireless local area network (WLAN). In another embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, etc.) to establish a picocell or femtocell. As shown in FIG. 1A, the base station 114*b* may have a direct connection to the Internet 110. Thus, the base station 114*b* may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102*a*, 102*b*, 102*c*, 102*d*. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102*a*, 102*b*, 102*c*, 102*d* to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102*a*, 102*b*, 102*c*, 102*d* in the communications system 100 may include multi-mode capabilities, i.e., the WTRUs 102*a*, 102*b*, 102*c*, 102*d* may include multiple transceivers for communicating with different wireless networks over different wireless links. For example, the WTRU 102*c* shown in FIG. 1A may be configured to communicate with the base station 114*a*, which may employ a cellular-based radio technology, and with the base station 114b, which may employ an IEEE 802 radio technology.

Figure 1B:
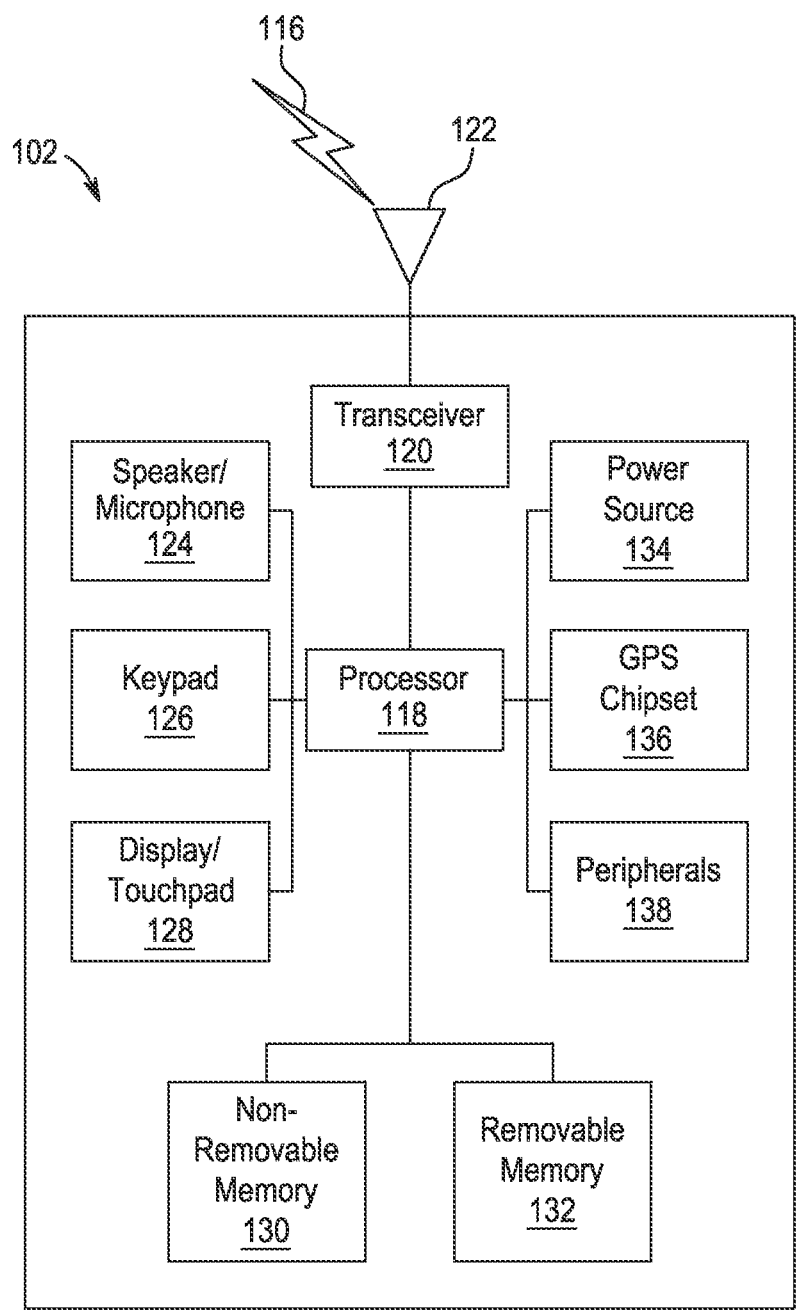
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
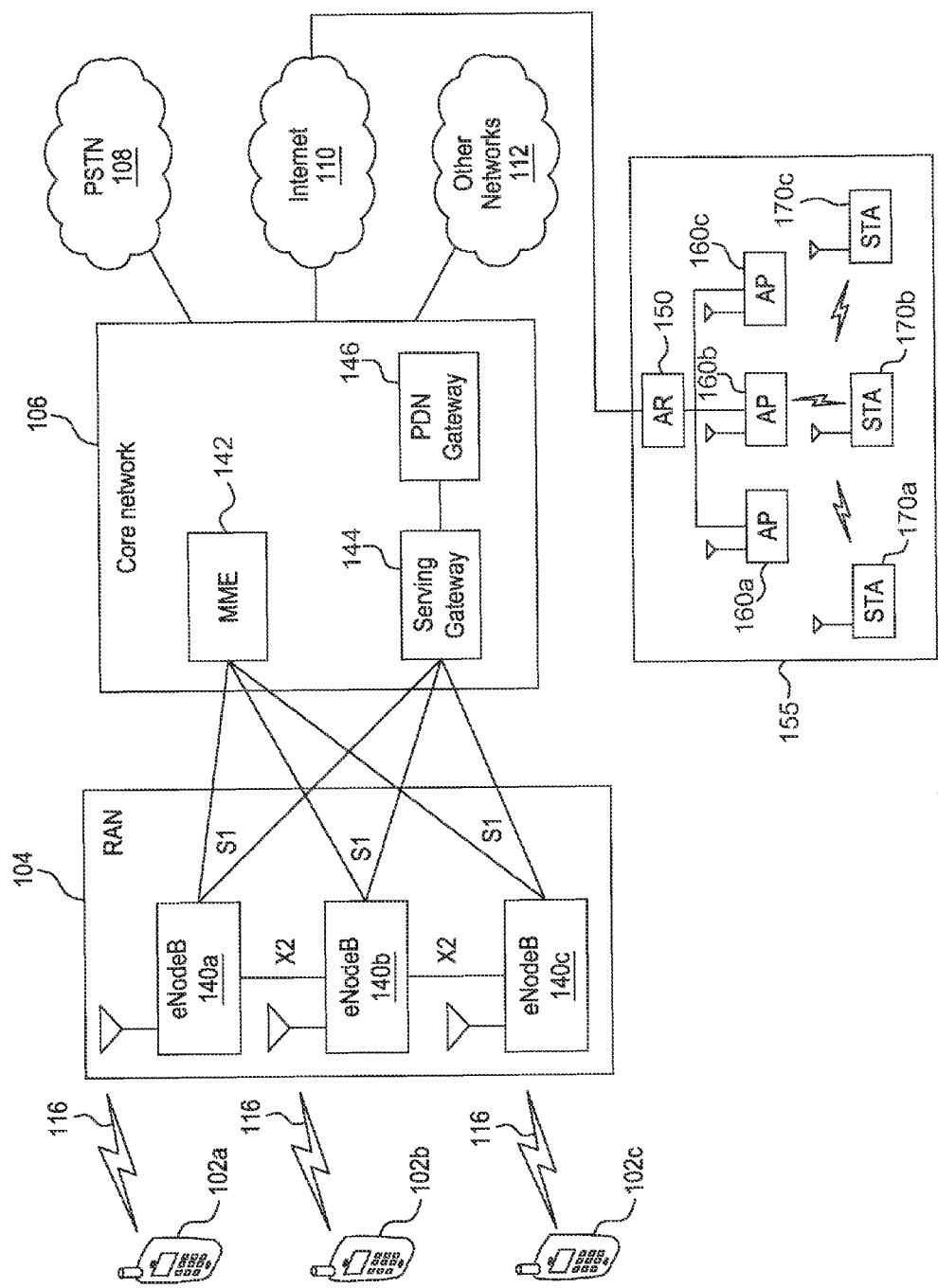
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 142a, 142b, 142c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices. An access router (AR) 150 of a wireless local area network (WLAN) 155 may be in communication with the Internet 110. The AR 150 may facilitate communications between APs 160a, 160b, and 160c. The APs 160a, 160b, and 160c may be in communication with STAs 170a, 170b, and 170c. The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Methods and apparatuses are described herein wherein communication among different geolocation databases or spectrum management functions that may be used to provide shared spectrum may facilitate incumbent user and secondary user protection.

As a result of the transition from analogue to digital TV transmissions in the 470-862 MHz frequency band, certain portions of the spectrum are no longer used for TV transmissions, though the amount and exact frequency of unused spectrum varies from location to location. These unused portions of spectrum may be referred to as TV White Space (TVWS). The United States Federal Communications Commission (FCC) has opened up these TVWS frequencies for a variety of unlicensed uses. These frequencies may be exploited by users for any radio communication if the communication does not interfere with other incumbent/ primary users of the frequencies. A device may be incumbent when it is a current holder of spectrum rights of use, and other devices may be prohibited from using the spectrum in a way which causes harmful interference to incumbents. So-called white space devices (WSDs) may be begin use of TVWS by contacting a geolocation database to determine whether the use of a specific channel in a given area is be allowed. The rules associated with accessing such databases were first defined by the United States FCC. Standard bodies such as the European Telecommunication Standards Institute Broadband Radio Access Networks (ETSI BRAN) and Internet Engineering Task Force Protocol to Access White Space (IETF PAWS) have since addressed standardization of the protocol and exchanged parameters for access to such databases.

As discussed above, several studies predict tremendous worldwide growth in the market size of mobile broadband services. For instance, according to one study, the market may grow from 1 billion users as estimated in 2012 to somewhere between 2.5 billion users (assuming conservative growth) and 8 billion users (assuming aggressive growth) in 2015. In addition, global mobile data traffic had more than doubled for the fourth year in a row in 2011, and may continue to do so through at least 2016. Thus, more spectrum may be needed for mobile broadband use.

Traditionally, spectrum use has been managed based on exclusive utilization of dedicated bands, and additional spectrum for mobile broadband has been created by repurposing of spectrum (i.e. moving incumbents to other bands). This was done for example with the 2.5 GHz band in most parts of the world, and more recently in clearing of parts of the UHF band due to the switchover to digital television, known as the Digital Dividend. With time, the practice of repurposing has become more difficult due to the nature of the incumbent services that would need to be moved to other bands. In particular, repurposing of existing services that are widely in use is an extremely costly and lengthy undertaking. For example, in one study it was estimated that a potential repurposing of the 1755-1850 MHz band would take 10 years and cost some $18 billion. As a result, regulators have begun to realize that methods other than repurposing may need to be used to obtain enough new spectrum to solve the bandwidth crunch.

Most spectrum bands are not fully utilized, and portions of these bands may be available for other uses on a geographical or temporal basis. New technical solutions are emerging that may allow sharing in bands where such sharing was previously not feasible. In addition to increasing utilization, band sharing may be used as a mechanism or tool that can complement repurposing. For example, in the US, to enable shared access to the federal spectrum, the PCAST report proposes a hierarchical three-tiered model for shared access.

Figure 2:
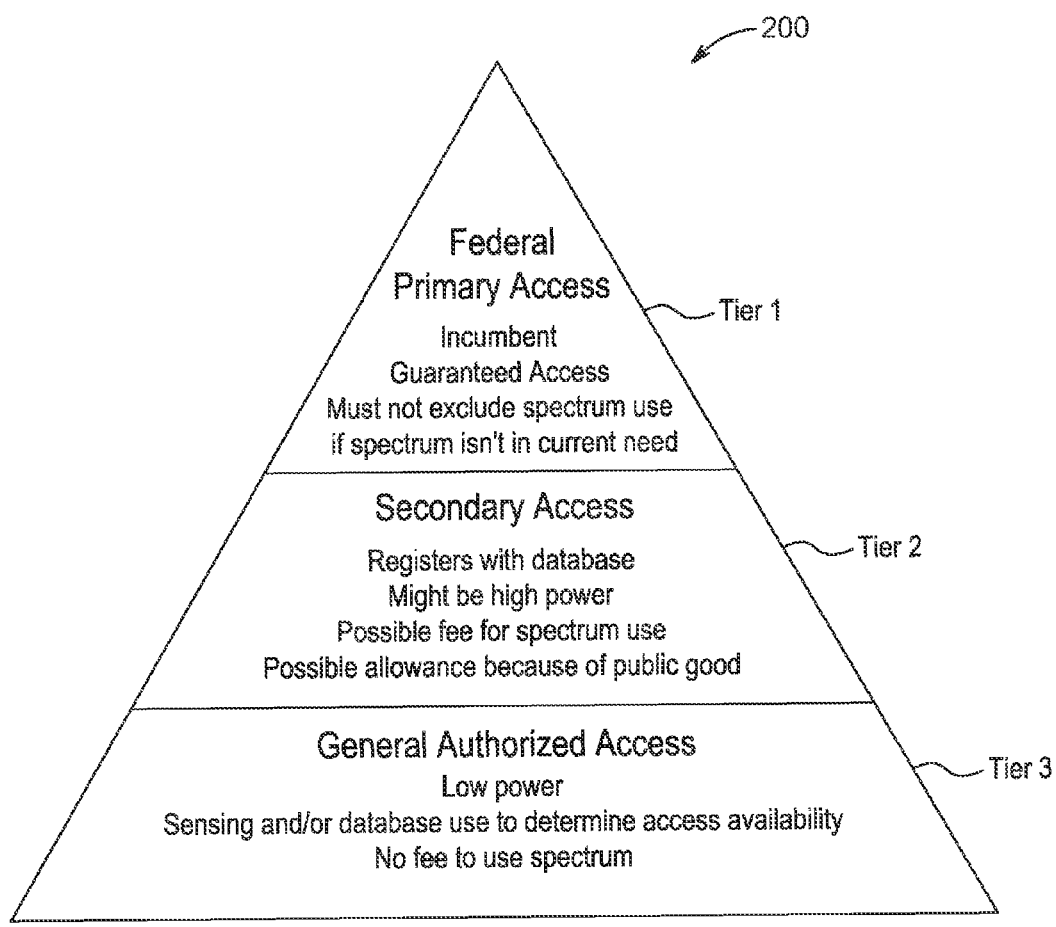
FIG. 2 is a diagram illustrating an example of a hierarchical three-tier spectrum sharing model.

FIG. 2 is a diagram illustrating an example of a hierarchical three-tier spectrum sharing model 200 for shared access to federal spectrum proposed by PCAST. Model 200 is a three-tier access model, where Tier 1 users are incumbent users (the "Federal Primary Access" users), Tier 2 users ("Secondary Access" or SA users) have a lower priority than Tier 1 when accessing the spectrum, and Tier 3 users ("General Authorized Access" or GAA users) have the lowest priority when accessing the spectrum. Tier 2 users may register with a database and pay a fee to receive an individual license for spectrum use, while Tier 3 users are not expected to pay fees for using the spectrum, which they may use in an opportunistic manner. One feature of the three-tier model is that a lower level use of the shared spectrum is not permitted to cause harmful interference to a higher level use. More information on the spectrum sharing model proposed in the PCAST report is provided in sections below.

In contrast, the approach to licensed spectrum sharing taken in Europe is Licensed Shared Access (LSA). LSA is a 2-tiered model (not shown), where first tier users include incumbents (e.g. governments, defense), and second tier users are authorized for "exclusive use on a shared and binary basis—Time, Location and/or Frequency—with the incumbent."

Figure 3:
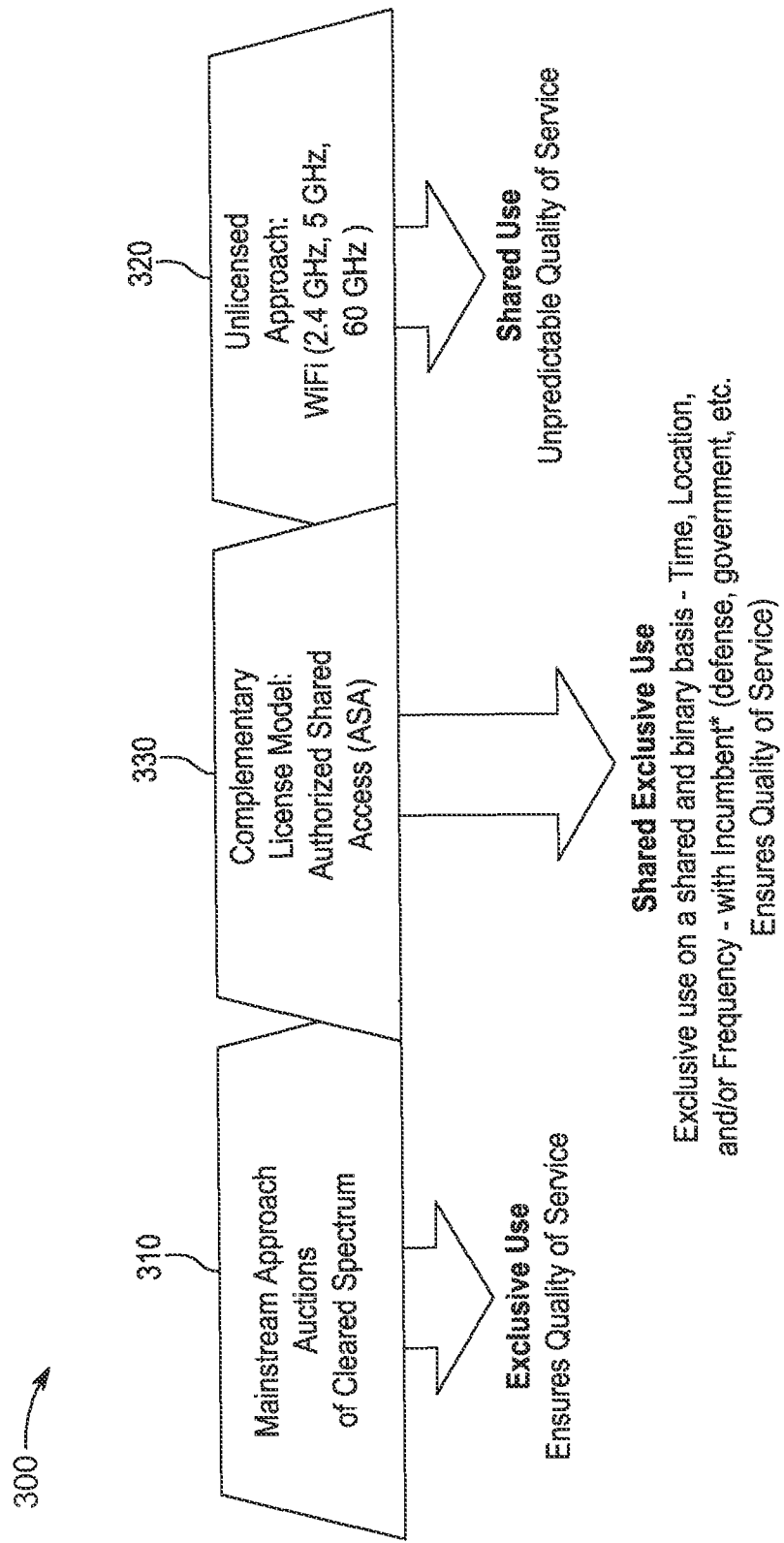
FIG. 3 is a diagram illustrating an example of various spectrum use models.

FIG. 3 is a diagram illustrating a comparison 300 between the traditional licensed approach 310, the unlicensed approach 320 and the LSA 330 approach to spectrum sharing. In the original proposal, the LSA was called Authorized Shared Access (ASA). The LSA model may be a good match for mobile network operators (MNOs), who may realize capacity enhancement when operating as Tier 2 users in shared spectrum.

The recent advent of the use of small cells may increase the feasibility of spectrum sharing and the amount of new spectrum that may be obtained through spectrum sharing. Small cells may make it easier to reuse a given frequency for geographically separated services, which may in turn increase the number of services that may share a given bandwidth during the times when the incumbent service or the government allows for other services to use the bandwidth. Another technical solution to facilitate sharing may include the utilization of new "cognitive technologies", such as access to geo-location databases and sensing.

Through spectrum sharing, mobile broadband services may effectively gain local or shorter term access to spectrum and thus may provide the same services as are presently provided using exclusive spectrum licenses without incurring the large costs associated with the purchases of such long term exclusive licenses. Therefore, the use of spectrum sharing may create opportunities for a new set of use cases. There may also be incumbent uses which allow deployment of larger cells and/or longer term licenses for shared use. Such uses may depend on the actual applications and frequency bands. The concept of shared access to spectrum, which may effectively make a significant amount of new spectrum available, may enable new entrants to the market, e.g. new network operators and virtual network operators.

In June 2010, the United States government released a presidential memorandum in which government agencies were requested to make 500 MHz of spectrum available for commercial use within 10 years. This request was intended to enable technology expansion and innovation in the mobile space in the US, while recognizing that such innovation may require the creation of new spectrum to be viable. In response to the memorandum, a report by the President's Council of Advisors on Science and Technology (PCAST) recommended that the United States government establish a policy to share under-utilized federal spectrum to the maximum extent possible and to identify 1000 MHz of spectrum in which to implement a new shared-use spectrum policy. A detailed plan for exploiting new federal spectrum has also been recommended.

The PCAST report concluded that the provision of additional spectrum may provide an opportunity for significant economic growth, but that providing additional spectrum through the traditional means of clearing services and relocating spectrum may not be feasible due to the time, cost, and inefficiency (due to spectrum fragmentation) associated with such approaches. Instead, it was recommended that new sources of spectrum be created by encouraging federal agencies to make more efficient use of spectrum by, for example, sharing their spectrum during periods when it is unused or in areas where other federal or commercial services may be deployed locally without creating harmful interference. The PCAST report further indicated that a new federal spectrum architecture governed according to a three-tier hierarchy may be adopted in the future, where the norm for spectrum use may be sharing, not exclusivity. Also recommended was the establishment of a framework for coexistence based on technical characteristics of both transmitters and receivers, thus stressing use of receiver performance when making spectrum allocations and the eventual improvement of receiver performance characteristics. Finally, the report recommended that mechanisms to evaluate the use of spectrum be evaluated not solely on the actual use of spectrum in MHz, but also on how effectively these mechanisms may allow for other services to use the same spectrum and not be precluded.

In the PCAST hierarchical spectrum model 200 shown in FIG. 2, Tier 1 users have the highest priority when accessing the spectrum and are guaranteed protection from interference (to the extent possible). When not using the spectrum fully, Tier 1 users may not exclude the spectrum use by other users. Tier 2 users may have lower priority when accessing the spectrum, and may need to register with a database to receive a temporary license for spectrum use. Tier 2 users may be expected to pay a fee for the spectrum license. Tier 3 users may have the lowest priority when accessing the spectrum, and may not be expected to pay fees for using the spectrum. While the PCAST report indicates that "sensing and/or database" may be used to determine access availability, initial implementations of the three-tier sharing model may include a database only and may evolve to hybrid database-sensing approaches in the future.

Figure 4:
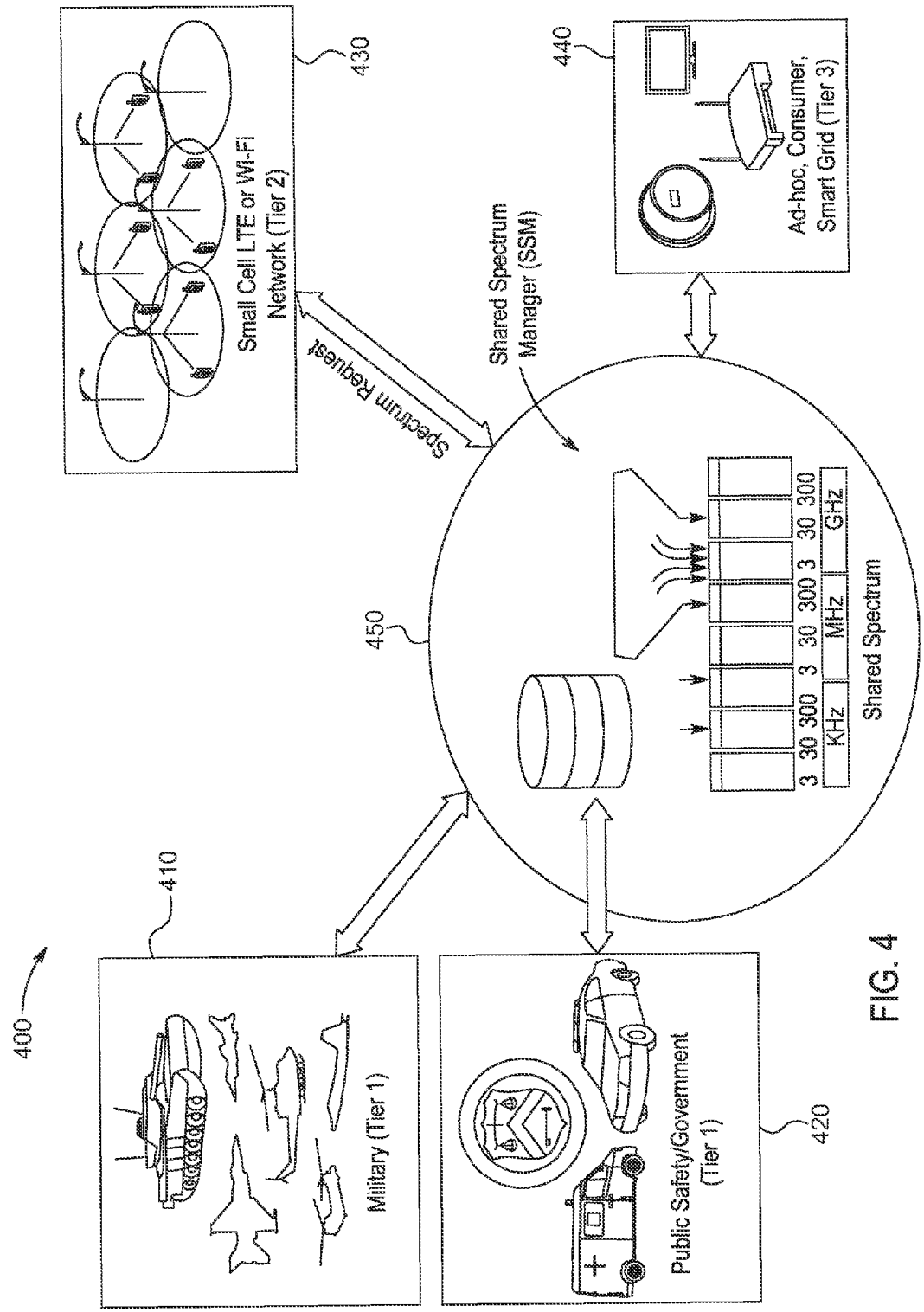
FIG. 4 is a high-level diagram of the President's Council of Advisors on Science and Technology (PCAST) 3-tier spectrum sharing model.

FIG. 4 is a high level diagram 400 of the PCAST 3-tier spectrum sharing model, which illustrates example Tier 1, 2 and 3 users. For example, Tier 1 users may include military communications users 410 and/or public safety and government communications users 420. Tier 2 users may include small-cell LTE or Wi-Fi networks 430, and Tier 3 users may include ad-hoc, consumer, or smart grid networks 440. Sharing among Tier 1, Tier 2, and Tier 3 users may be managed by a shared spectrum manager (SSM) 450.

The PCAST report also set out a plan to implement these recommendations over the next 10 years. The spectrum between 2700 MHz and 3700 MHz was identified as substantially underutilized and targeted for initial trial and implementation of the three-tier approach. Central to the proposed plan is the design and implementation of a Spectrum Access System (SAS) which may manage the usage and assignment of spectrum based on the three-tier approach. The creation of a receiver management framework was also planned, in which receiver interference limits may be defined for federal systems and may be used by the SAS for making spectrum allocation decisions. Finally, the report describes the creation of a Test City and Mobile Test Service, respectively for verification of the spectrum sharing environment and for allowing compatibility testing with federal services that may not be moved to test facilities. Funding for the project may come from a spectrum efficiency fund, which may also be used to reward federal agencies that upgrade their systems to use new spectrum sharing technologies.

In addition, a recent Notice of Proposed Rulemaking (NPRM) released by the FCC proposes to create a new Citizens Broadband Service (CBS) in the 3550-3650 MHz band, which is currently utilized for military and satellite operations utilizing small cells and spectrum sharing. The proposal reflects recommendations made in the PCAST report as it proposes to structure the CBS according to a similar multi-tiered shared access model. The three tiers have been referred to as Incumbent Access (Tier 1), Priority Access (PA, Tier 2), and General Authorized Access (GAA, Tier 3).

There may be a requirement to protect existing federal systems (incumbent) operating in the 3.5 GHz band, and there may also be the requirement to protect the PA use from harmful interference from the GAA use.

The NPRM expands on the recommendations of the PCAST report by addressing a specific band and also makes a proposal about the foreseen Priority Access and General Authorized Access users. In contrast to the PCAST, the NPRM foresees that various Quality-of-Service (QoS) dependent users, possibly including hospitals, utilities, state and local governments, etc. may be Priority Access users. However, residential and business users, including network operators may be primarily General Authorized Access users. Another difference between NPRM and the PCAST is that the NPRM does not address the economic incentive for the incumbent users, which is an important aspect in the PCAST report. It also suggests allowed operational areas for each access type based on zones and fixed limits for the maximum transmit power of the devices. Within the NPRM are numerous detailed proposals, such as the possibility of extending the 3.5 GHz band to include frequencies in the range of 3650-3700 MHz and the possibility of permitting PA usage only indoors. The fact that the PA and GAA usage is allowed only within specific zones, the possibility of utilizing band segmentation, and the possibility of defining common maximum transmit powers for devices suggests that the SAS functionalities required by the NPRM may be considerably simpler than the SAS functionalities required by the PCAST. The NPRM suggests that it may be modeled on the TV WS database concept.

Regulators in Europe, including both the European Conference of Postal and Telecommunications Administrations (CEPT) and the European Commission, have also realized the importance of spectrum sharing, and efforts toward standardization and policy changes for allowing spectrum sharing through Licensed Shared Access (LSA), originally known as Authorized Shared Access, have begun.

For example, European Conference of Postal and Telecommunications Administrations (CEPT) project teams were set up to address the 2300-2400 MHz band, in which the deployment of Fixed and Mobile Communication Networks (MFCN) may be expected to utilize LSA. An ECC Decision was developed regarding the frequency arrangements in the 2300-2400 MHz band and regarding guidance as to how the LSA framework in that band should be applied. Because the 2300-2400 MHz band is identified for International Mobile Telecommunications (IMT), the first technology foreseen to be deployed is IMT. Border coordination issues have also been addressed by CEPT.

The LSA approach to shared spectrum management may be summarized as follows: current incumbent usage may continue, while unused portions of the band in question may be exclusively assigned to a secondary user, such as a mobile broadband operator, or in some cases to two or more operators. If there are more than two LSA licensees, each cannot have exclusive rights to the shared band, and coordination among the licensees may need to be employed in order to allow for acceptable quality of service (QoS). The LSA framework itself is technology and band neutral, but in practice it may first be applied to make additional spectrum available for mobile broadband.

Figure 5:
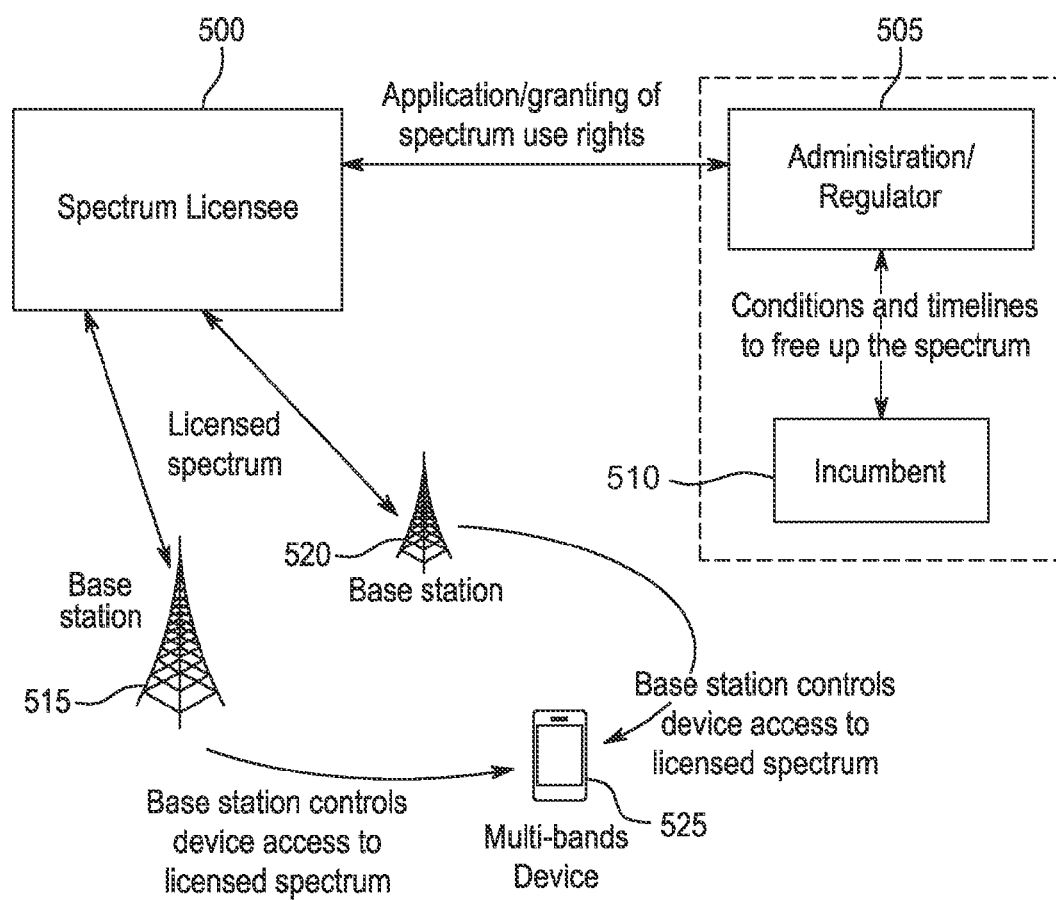
FIG. 5 is a diagram illustrating an example of a traditional individual spectrum licensing model.

FIG. 5 is a diagram which illustrates an example of a traditional individual spectrum licensing framework. A spectrum licensee 500 may apply to an administration or regulator 505 for grant of spectrum use rights. Regulator 505 may grant spectrum use rights to the spectrum licensee 500 based upon current conditions and/or use of the spectrum by an incumbent 510. Upon grant of spectrum use rights, the spectrum licensee 500 may operate transceivers 515, 520, for example, which may control access to the licensed spectrum by a device 525, which may be a multi-band device.

Figure 6:
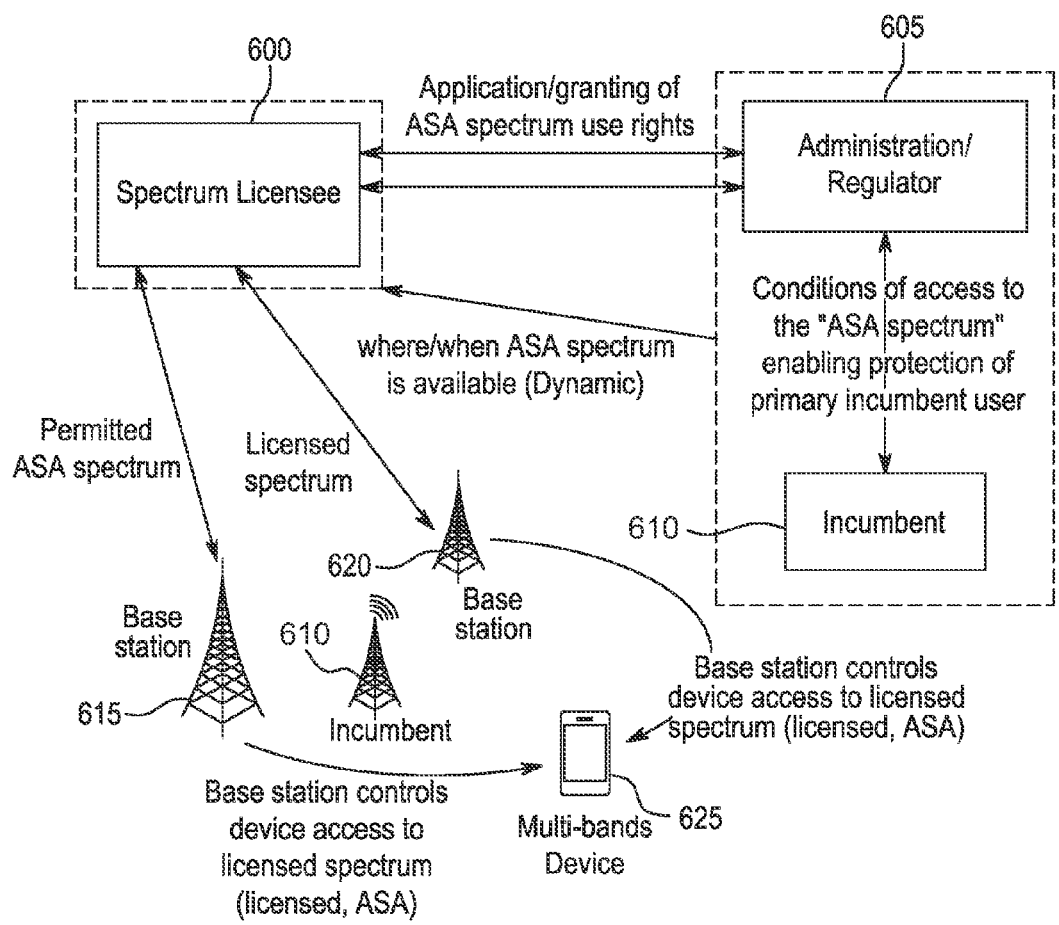
FIG. 6 is a diagram illustrating an example of the Licensed Shared Access (LSA) spectrum sharing model.

FIG. 6 is a diagram which illustrates an example of the LSA spectrum sharing framework. A spectrum licensee 600 may apply to an administration or regulator 605 for grant of spectrum use rights. Such spectrum use rights may be exclusive on a shared and binary basis with the incumbent 610 (i.e. "second tier"). Regulator 605 may grant shared spectrum use rights to the spectrum licensee 600 based upon current conditions and/or use of the spectrum by incumbent 610. Upon grant of first tier spectrum use rights, the spectrum licensee 600 may operate transceivers 615, 620, for example, which may control access to the licensed spectrum by a device 625, which may be a multi-band device, in such a way as not to interfere with the operation of incumbent 610.

Several factors may impact the way LSA is organized and implemented in practice. These factors may include, but are not limited to, the bands and spectrum use of the incumbent, and the needs of the LSA licensee(s). For instance, in the case where there may be several bands, incumbents, and LSA licensees, utilization of a centralized entity such as a Spectrum Manager or SAS may be beneficial. Alternatively, in the case where a single incumbent may leave some spectrum available for a single LSA licensee to use in a relatively static way, the sharing may be done without a centralized entity. The division of responsibilities among the stakeholders (administration, incumbent, and LSA licensee), the technical requirements for spectrum access (e.g. ACLR, spectrum masks, etc.), as well as the need or use of economic incentives, may also be factors that impact the LSA implementation.

As aforementioned, the 2300-2400 MHz band may be expected to become the first band within CEPT where the LSA framework is utilized. Because the incumbent usage of the 2300-2400 MHz band varies within the countries of CEPT, it may be assumed that some countries may make at least portions of the 2.3 GHz band available for IMT in a dedicated manner, some may be able to make portions available using the LSA, and some may not be able to make any portions available for IMT.

Another report has concluded that an advantage of LSA lies in allowing for more efficient use of spectrum whilst also providing an alternative to exclusive segmentation or re-purposing of a band when there is a need for find new spectrum. Yet another report concluded that with demands on the radio spectrum becoming more intense, efficient and productive use of the spectrum may be accomplished by applying innovative and flexible authorization schemes such as shared spectrum access. The European Commission has also issued a mandate for standardization of Cognitive Radio Systems (CRS) that includes standardization of both TV White Spaces and LSA, and requires the need for defining the interface between geolocation databases which control CRSs.

The ETSI Technical Committee for Reconfigurable Radio Systems (TC RRS) has also begun standardization of the use of TV White Spaces under the assumption of a coordination function or spectrum coordinator (SC). Such usage of spectrum may be termed coordinated usage of spectrum because, aside from a geolocation database that protects against harmful interference to the incumbent, the architecture also includes a SC that ensures that harmful interference between the CRSs themselves is avoided.

Assignment of shared spectrum is currently managed by a geolocation database, which protects nearby incumbents and assigns spectrum to secondary systems as long as harmful interference to the incumbent is avoided. Such is the case in TVWS. Similarly, a spectrum manager (similar to a SSM) in any shared spectrum may provide additional coexistence services for users under its management.

It may be possible that different geolocation databases, each serving a different geographical area for example, may have some areas or coverage overlap. A secondary user of spectrum managed by one database may cause interference to incumbents which are in principle managed by another database. This same issue also may apply to different coexistence management functions which may have overlapping management areas. In the above cases, synchronization or communication between the databases or between the spectrum management functions may be performed to avoid harmful interference.

A victim database discovery procedure that may be guided by an initial list of potential victim databases which may be defined by physical properties such as the geographic or regional relationships of the areas which may be protected by each database is described herein.

A one-time, periodic, or occasional exchange of incumbent information between two databases, whereby a querying database may request incumbent information from a victim database and may use the incumbent information in order to assign parameters to shared spectrum devices without harming the incumbents of the victim database is also disclosed.

Also described herein is a one-time, periodic or occasional exchange of information between databases whereby a querying database may receive (from a victim database) restrictions on associated operating parameters of CRSs under its control in an area that may be defined by a contour, on a channel, or other similar configuration. Such limitations may be related to the transmit power of the CRSs but also may be related to the operating behavior or other parameters related to the transmissions of those CRSs.

Finally a procedure is described herein by which a database that receives a request for shared spectrum from a CRS may first forward the request to a neighboring database to determine the allowable channels with respect to the incumbents protected by that database and then may make the actual allocation based on this information and its own incumbents.

Initially, a geolocation database may not be aware of the other geolocation databases with which it may consult in order to avoid an assignment of spectrum that causes interference to incumbents managed by other databases. For instance, incumbent usage information may change over time, which may impact whether devices operating under the control of one geolocation database would affect the protection of incumbents managed by a different geolocation database. For this reason, a specific database may determine which other databases it may need to communicate with so that it may assign channels without causing harmful interference to incumbents managed by those other databases.

The term "victim database" may be used herein to refer to a database with which a first database needs to consult because there is a possibility that the first database may assign spectrum to secondary users in such a way that it affects the incumbents managed by the "victim database."

Figure 7:
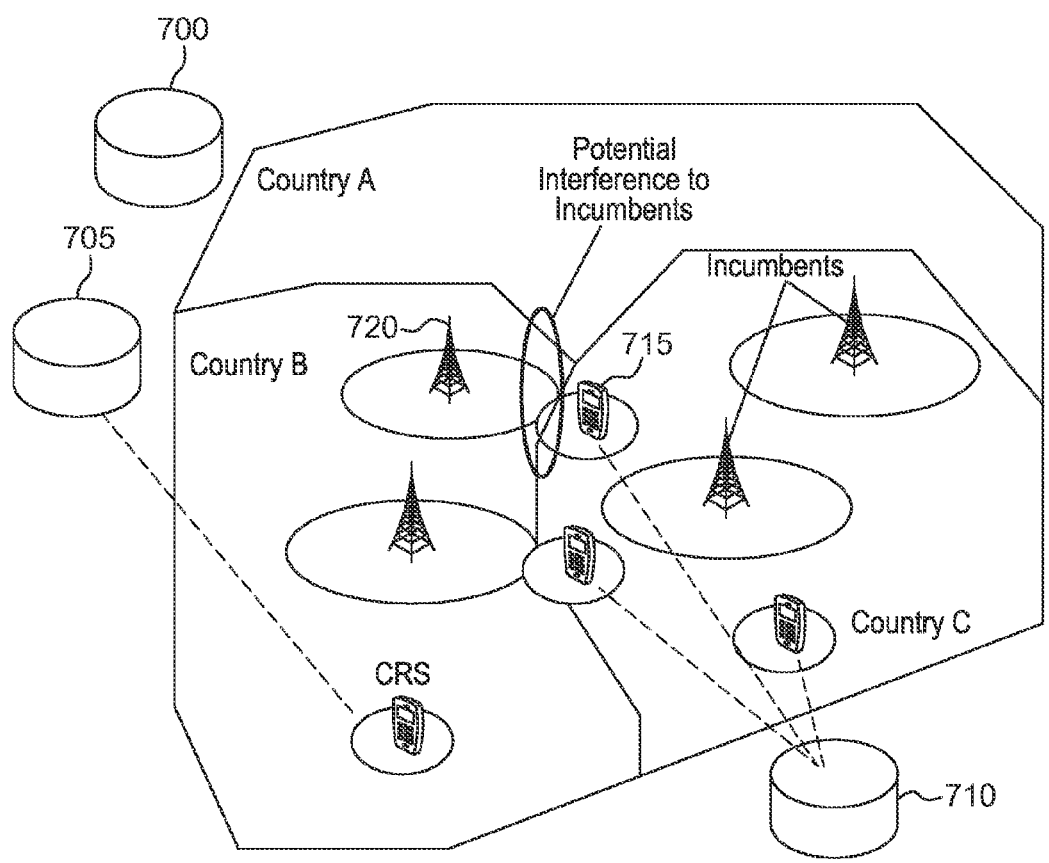
FIG. 7 is a diagram illustrating an example of a multi-country border spectrum sharing scenario.

FIG. 7 is a diagram showing an example multi-country border spectrum management scenario, which illustrates an example use of a victim database. Countries A, B, and C may each have geolocation databases 700, 705, and 710 respectively, each of which may assign spectrum to CRSs in order to protect against interference with incumbents in its own country. For example, CRS 715 in country C may be managed by database 710 but may have the potential to interfere with an incumbent 720 in country B by operating on a certain frequency at a certain power in a certain location. In this case, the geolocation database 705 for country B may be considered a victim database with respect to database 710 of country C, because database 705 controls an incumbent (in this case incumbent 720) which is negatively affected by a CRS (in this case CRS 715) controlled by database 710.

It is noted that geolocation databases 700, 705, and 710 may each be or include a computer server which is in communication with a core network such as core network 106, for example via the internet 110, other networks 112, or a PSTN 108 (FIG. 1). The geolocation databases 700, 705, 710 may be a part of the core network in some implementations.

In order for a database to discover "victim databases" without excessive signaling overhead, a list of "potential victim databases" may be first created and made available for each database. It is noted that such list may be a subset of all geolocation databases. In this way, signaling overhead may be reduced by reducing the total number of potential victim databases which the database must interrogate to determine "actual" victim databases. Such a list of potential victim databases may be determined purely by geography or by a combination of geography, frequency band, and/or usage time. For instance, in the case of two countries, each operating a national TVWS database and having a common border, it may be possible that secondary devices operating in one country may affect the incumbents in the neighboring country. In this case, the databases of the respective countries may be victim databases for each other.

For example, database 700 of country A may be placed in a list of potential related databases for the database 705 of country B, and vice versa. Such a list may be determined by an overseeing body. For instance, in a region such as Europe where each country may have its own geolocation database for TVWS and where a country may share several borders, the European Union or CEPT, as an overseeing body, may determine the list of potential related databases for each country and may provide this list to the country. Such list may be hosted on a server for access via the Internet or made available by any other suitable medium.

If it is determined that interference may not occur between two particular databases, then they may not need to be placed on each other's respective list of affected databases. For instance, if the two databases managed by neighboring countries are known to manage separate unrelated frequency bands, then they may need not be entered into the list of potential victim databases of each other.

With a list of potential victim databases available, each database may then perform a discovery procedure to determine which potential victim databases are "actual" victim databases. As mentioned above, the victim databases may change over time due to potential variability of incumbent information, equipment deployment, etc. In addition, the overseeing body which creates the list of potential victim databases may not be fully aware of all of the details of the incumbent protection criteria, and for this reason, a further discovery process may be required to avoid the need to communicate with databases which are not truly victim databases.

Figure 8:
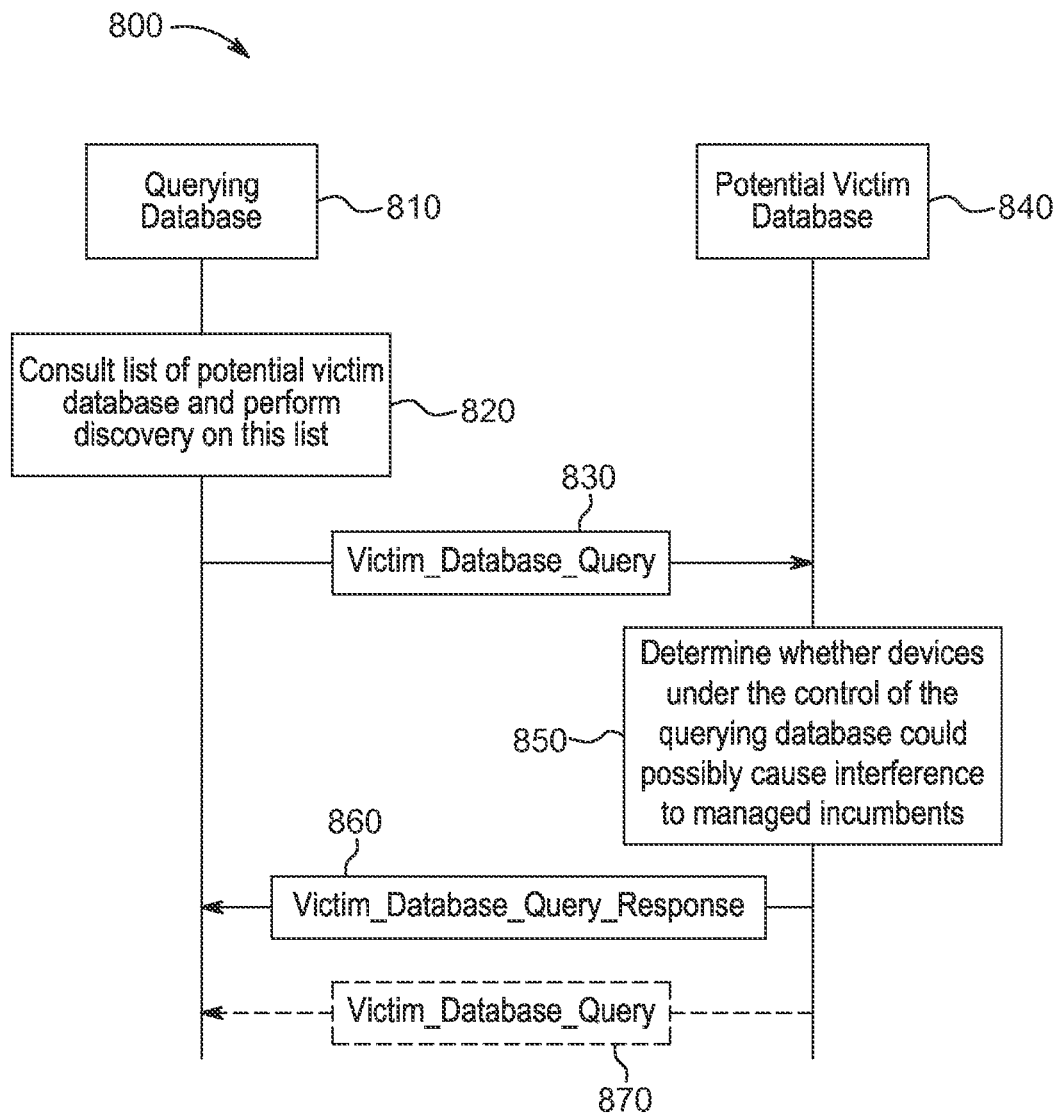
FIG. 8 is a diagram illustrating an example victim database discovery procedure.

FIG. 8 is a diagram which illustrates an example victim database discovery procedure 800. A querying database 810 may consult a list of potential victim databases in a step 820 and may perform discovery on that list. In this example, potential victim database 840 may be contained in such a list. The querying database 810 may accordingly transmit a victim database query 830 to potential victim database 840. In response, potential victim database 840 may determine in a step 850 whether devices under the control of the querying database 810 have the potential to cause interference with incumbents managed by potential victim database 840. The potential victim database 840 may then transmit a victim database query response 860 to the querying database reflecting this determination.

In some implementations, victim database query message 830 may provide the potential victim database 840 with information needed to determine whether transmissions by secondary systems (e.g. systems which would be considered Tier-2 under the PCAST three-tier access model illustrated in FIG. 2) managed by the querying database 810, would cause interference to incumbents (e.g. systems which would be considered Tier-1 under the PCAST three-tier access model illustrated in FIG. 2) managed by the potential victim database 840. Such information may include a maximum potential transmit power that may be allowed to a secondary system by the querying database 810, as well as a range of geographical locations where a secondary system may be assigned spectrum by querying database 810. It is noted that in some implementations victim database query message 830 may include information relating to systems other than secondary systems.

For instance, in some countries, regulations may impose an overall maximum transmit power on devices operating in shared spectrum. The query message 830 accordingly may include an indication of an overall maximum transmit power of a device managed by querying database 810, and may also include possible locations of a transmitting device managed by querying database 810. The possible locations may be included in the form of a geographical range or contour defining the area managed by the querying database 810. The possible locations may also be included in the form of a worst case location (north, south, east, or west), which the potential victim database 840 may use in calculating whether interference may be caused to incumbents managed by potential victim database 840. Query message 820 also or alternatively may include an estimate of the maximum overall interference which may be created at the border of an area managed by the potential victim database 840. Such an estimate may require the calculation of possible aggregated interference, as well as path losses from the worst case location of the devices to the border of the area managed by the potential victim database 840. Such calculations may also use the characteristics of known devices which may be allowed to use the spectrum under the control of the querying database 810 (e.g. allowed RATs or RAT causing a worst case interference, spectrum masks required in that country, etc.). Because each country may have its own regulations related to the usage of shared spectrum, this calculation may best be made by the querying database 810 (rather than the potential victim database). The information provided by the querying database 810 may also be band or channel specific. For instance, the two databases 810, 840 may each manage spectrum on different bands or channels, and a different worst-case power may be applicable for each band or channel.

Upon receipt of the victim database query message 830, the potential victim database 840 may determine, based on the information provided by the querying database 810, which if any devices under the control of the querying database 810 may possibly cause interference to incumbents managed by the potential victim database 840. The victim database query message response 860 may then include an indication of this determination (i.e. whether or not the potential victim database 840 is an actual victim database or not). If the potential victim database 840 is an actual victim database, further mechanisms/procedures may be performed to avoid interference with incumbents in the victim database. If potential victim database 840 is not an actual victim database, there may be no further communication between the two databases 810,840 at this time.

The victim database query message 830 may be sent individually and sequentially to each of the databases on its list of potential victim databases (not shown). Alternatively, the database query message 830 may be broadcast or a multicast and be addressed only to the list of potential victim databases. For instance, in the case of a broadcast message, a database (not shown) which may receive the database query message 830 but which is not specifically addressed as a potential victim database may not send a response message.

The victim database discovery procedure 800 may be performed by querying database 810 initially (i.e. prior to its operation). Alternatively, database discovery procedure 800 may be performed periodically or occasionally to account for potential changes in the incumbent information (such as deployment of incumbent transmitters or receivers). The victim database query response message 860 may also indicate a period or timing with which the querying database 810 may repeat discovery process 800. This may allow the potential victim database 840 to dictate the timing of changes to incumbent equipment deployment.

The victim database discovery procedure 800 may also provide or be a trigger for the potential victim database 810 to perform a query with another database (not shown). For instance, in the case where the querying database 810 in the above procedure is a database that is initially provisioned, it may also itself be a victim database for the potential victim database 840. In this case, after database 810 has performed the victim database discovery procedure 800 with database 840, database 840 may be triggered to send a Victim Database Query message 870 to database 810 as a result.

The victim database discovery procedure 800 may also be used to define the requirements for communication between the querying database 810 and the victim database 840 when spectrum is actually allocated to a CRS by the querying database 810. For instance, the Victim Database Query Response 860 may define the conditions under which the querying database 810 may need to check first with the victim database 840 before assigning channels or powers to a CRS under control of the querying database 810. For example, Victim Database Query Response message 860 may define a geographical range (under the managing area of the querying database 810) within which a CRS may potentially cause interference to an incumbent. This range may be obtained or derived from parameters contained in the Victim Database Query message 830, such as the overall managing area of the querying database 810, the types of devices expected to be managed by the querying database 810 and/or their operating band, as well as the allowable maximum power which the querying database 810 may theoretically assign to these devices.

Once a database has determined its actual victim databases, if any, two mechanisms may be used to by the database to assign spectrum without causing harmful interference to incumbents managed by the victim database. The first mechanism may include the querying database obtaining information about the incumbents to be protected (which may be managed by the victim database) and the second method may include the victim and querying databases exchanging actual CRS information at the time of each CRS assignment.

As a result of the victim database discovery procedure, the victim database may be able to determine which incumbent(s) under its management may suffer from harmful interference from transmissions from devices managed by another database. Accordingly, the victim database may send information regarding protection criteria for that or those specific incumbent(s) to the querying database, so that the querying database may then assign spectrum to devices in shared spectrum without harming the incumbents managed by the victim database. In addition, because each country may have specific regulations regarding allowable interference to incumbents and regarding how this interference is calculated, such country specific rules also may be exchanged as part of the incumbent information.

It is noted that such information may be sent only once, or only each time the actual incumbent information is changed in the victim database for example. In this case, the victim database may communicate to the querying database a frequency or other timing indication with which the subsequent queries may be issued. By communicating the timing with which the querying database should issue subsequent queries, the victim database may be enabled to update incumbent information within an appropriate time window to avoid interference from devices managed by the querying database.

Figure 9:
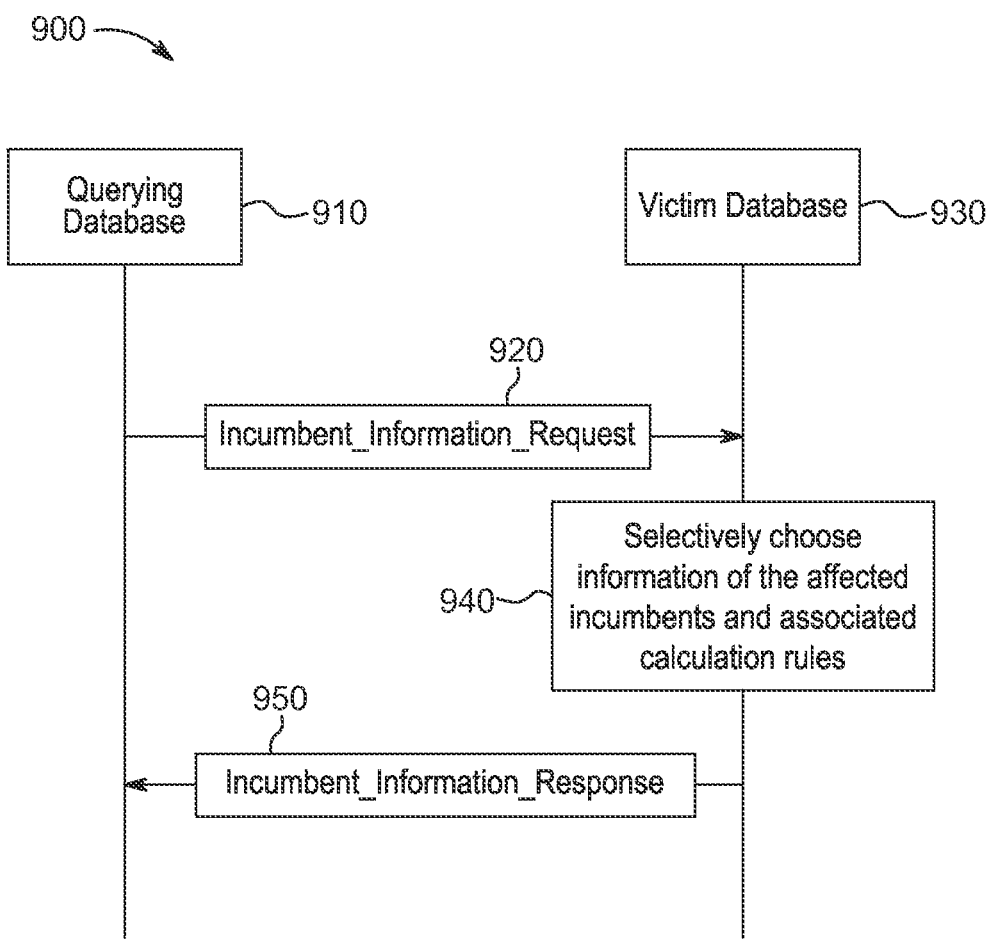
FIG. 9 is a diagram illustrating an example incumbent information retrieval procedure.

FIG. 9 is a diagram illustrating basic information flow for an example incumbent information retrieval procedure 900. The querying database 910 may transmit an incumbent information request 920 to the victim database 930. The victim database 930 may then choose information regarding the affected incumbents and/or associated calculation rules in a step 940. The victim database may then transmit the incumbent information response 950 to the querying database 910. It is noted that victim database 930 may have been determined to be an actual victim database via a victim database discovery procedure similar to procedure 800 (FIG. 8).

The incumbent information request message 920 in this example may simply include a request for information about the affected incumbents from the victim database, and in some implementations may not contain any additional information. The incumbent information response message 950, on the other hand, may contain protection criteria for only those specific incumbents which may have the potential of being interfered by the devices managed by the querying database 910 (e.g. as determined via procedure 800 shown and described with respect to FIG. 8). Such protection criteria may include information such as the location of transmitters/receivers of the incumbent and/or rules for calculating harmful interference that may be specific to those incumbents or specific to a regulation to which victim database 930 is adhering, such as a maximum field strength at an incumbent allowed to be caused by a device managed by querying database 910, for example.

Alternatively, the victim database 930 may wish to keep the information related to its incumbents as confidential as possible. In this case, the victim database 930 may calculate possible protection regions or contours within which the operation of devices controlled by the querying database 910 should be restricted. In particular, the victim database 930 may specify that on a specific channel, devices managed by the querying database 910 within such regions and/or contours may not operate, or may need to operate with certain limitations. These limitations may include a maximum power with which such devices may operate. Such limitations may also include the use of a portion of the entire channel, or imposing the use of certain techniques for coexistence (such as sensing, transmission gaps, etc.) on the devices for them to operate.

In order to account for the effects of aggregate interference (i.e. in order for the victim database 930 calculations to be more accurate and to take into account the potential number of devices operating under the control of the querying database 910), the querying database 910 may repeat the procedure 900 each time the number of devices changes from one range to another range. For instance, the incumbent information request message 920 may indicate the current range of the number of devices operating (initially, we assume 0-x for example) which are managed by querying database 910. Incumbent information response 950 may in response provide power restrictions associated with the worst case number of devices of x. When the number of devices that are actually assigned spectrum by the querying database 910 exceeds x, the querying database 910 may repeat the above procedure with a new range for the number of devices.

Figure 10:
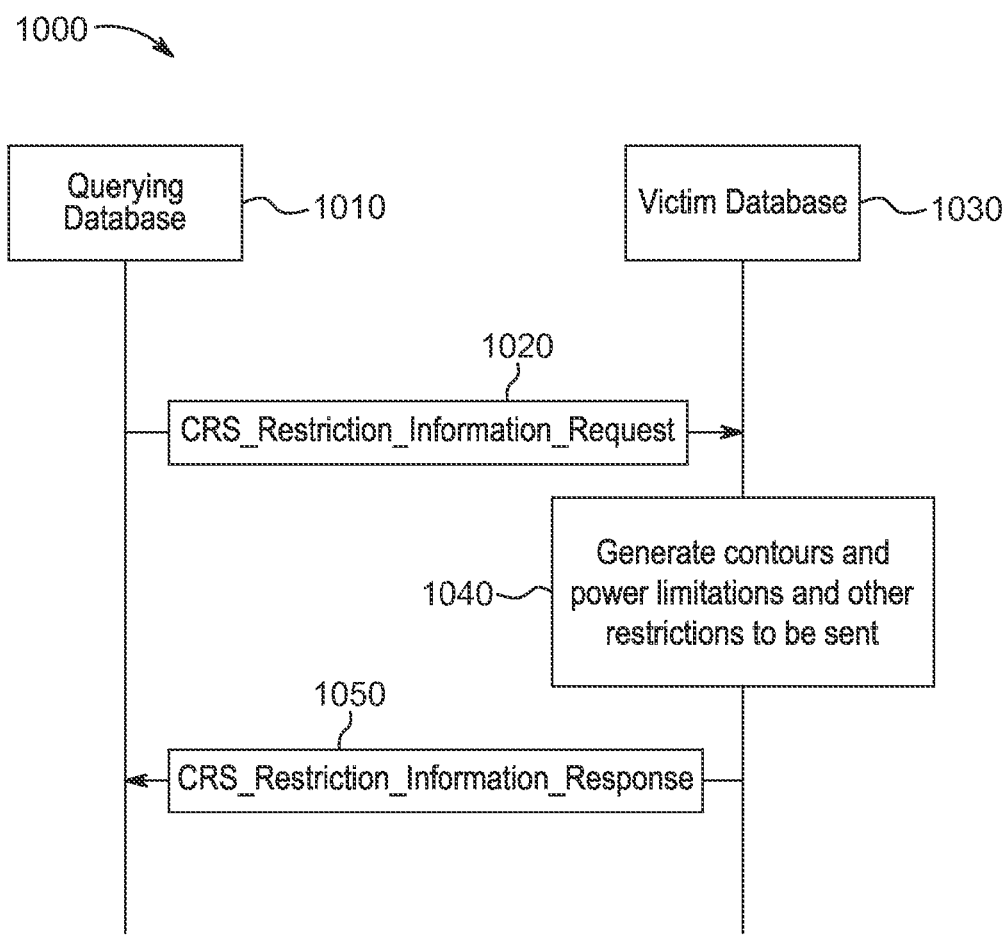
FIG. 10 is a diagram illustrating an example CRS restriction information retrieval procedure.

FIG. 10 shows basic information flow in an example CRS restriction information retrieval procedure 1000. Procedure 1000 illustrates a case where victim database 1030 may send protection regions or contours to the querying database 1010. In some implementations, the victim database 1030 may only send such protection regions or contours to the querying database 1010.

In the example of FIG. 10 the querying database 1010 may transmit a CRS restriction information request 1020 to the victim database 1030. The victim database 1030 may generate regions or contours and power limitations and/or other restrictions in a step 1040. Such regions, contours, and/or power limitations may be determined by victim database 1030 based upon information included in the CRS restriction information request 1020 as will be discussed in further detail below. The victim database 1030 may then transmit the CRS restriction information response 1050, which may include such regions or contours and power limitations or other restrictions, to the querying database 1010.

The CRS Restriction Information Request message 1020 may contain information about the operation of CRS or other devices managed by the querying database 1010 in order for the victim Database 1030 to determine the applicable restrictions to be applied. Such information may include, for example, the region or band on which devices managed by querying database 1010 operate. The CRS Restriction Information Response message 1050 may then contain the restrictions to be applied by the querying database 1010 to the CRSs it manages (as described herein).

In some cases, procedures 900 (FIG. 9) and/or 1000 (FIG. 10) may be combined or merged with the victim database discovery procedure 800 (FIG. 8). For instance, a victim database query response message 860 in the victim database discovery procedure 800 may contain incumbent information or the device operation limitations similar to those contained in incumbent information response 950 or CRS restriction information response 1050 respectively as discussed with respect to FIGS. 9 and 10.

Incumbent information or CRS restriction information may also be sent by the victim database to relevant databases without being preceded by a query request from such database. For instance, during the discovery process 800 shown in FIG. 8, the potential victim database 840 may learn of databases (not shown) that manage CRSs which may cause harmful interference to its incumbents. It is noted that potential victim database 840 may learn of such databases via means other than a victim database query such as message 830. Potential victim database 840 may keep track of such databases and may send (either periodically, or a single time following the discovery procedure) relevant incumbent information or CRS restriction information to such database(s) (not shown). In some implementations it may be expected that such database(s) may then confirm the incumbent or CRS restriction information.

In a second approach, the querying database 810 may communicate to the victim database 840 actual information regarding devices which request access to the spectrum from the querying database 810. The victim database 840 may then be able to protect its own incumbents through the knowledge of the actual characteristics of the devices that may be using the spectrum. For example the victim database may determine modified operational parameters for a device that has requested access to spectrum based on the actual characteristics, and may send the modified operational parameters to the querying database.

Figure 11:
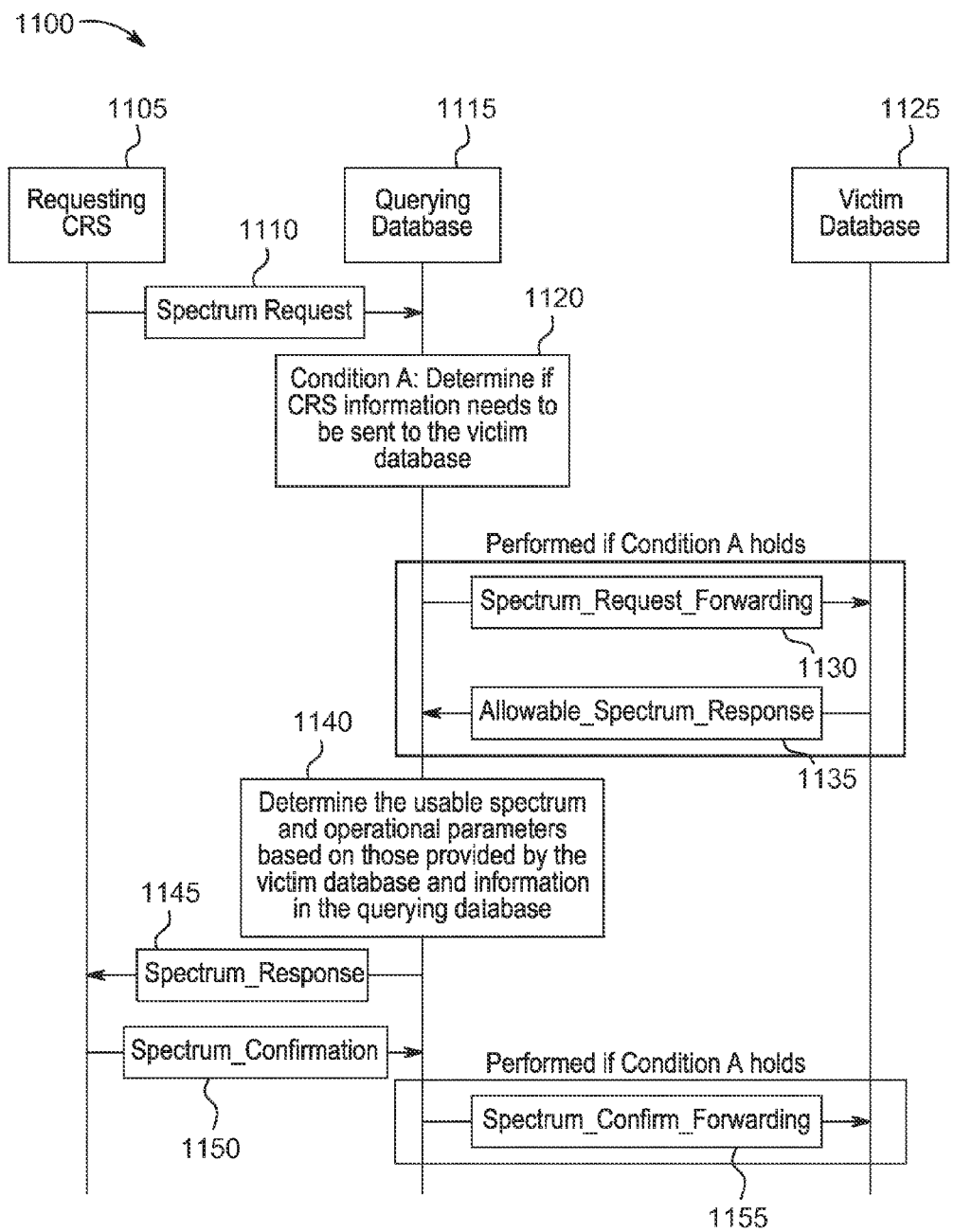
FIG. 11 is a diagram illustrating an example CRS information exchange procedure.

FIG. 11 is a diagram illustrating an example CRS information exchange procedure 1100 among a requesting CRS 1105, querying database 1115, and a victim database 1125. The requesting CRS 1105 may transmit a spectrum request 1110 to the querying database 1115. In a step 1120 the querying database 1115 may determine whether CRS information needs to be sent to the victim database 1125. If querying database 1115 determines that CRS information needs to be sent to the victim database 1125 ("condition A"), the querying database 1115 may transmit a spectrum request forwarding message 1130 to the victim database 1125. The victim database 1125 may transmit an allowable spectrum response message 1135 to the querying database 1115 in response. The querying database 1115 may then in a step 1140 determine the usable spectrum and operational parameters for requesting CRS 1105 based on those provided by the victim database 1125 and information in the querying database 1115. The querying database 1115 may then transmit a spectrum response 1145 to the requesting CRS 1105. The requesting CRS 1105 may then transmit a spectrum confirmation message 1150 to the querying database 1115. If condition A holds, a spectrum confirmation forwarding message 1155 may be transmitted to the victim database 1125.

A requesting device or CRS 1105 may first request spectrum from the database which controls its access to spectrum (in this case, the querying database 1115). This spectrum request 1110 may include or indicate certain device parameters associated with the device or CRS 1105 (e.g. location, antenna height or other characteristics, spectrum mask, radio access technology (RAT), etc.). Prior to responding to the spectrum request 1110, the querying database 1115 may need to make the same request for spectrum from the victim database 1125 (e.g. via spectrum request forwarding message 1130) in order to ensure that the assignment to the CRS 1105 does not cause harmful interference to any incumbents managed by the victim database 1125. The querying database 1115 accordingly may determine in step 1120 whether it needs to check with the victim database 1125 for the available channels and allowable power levels of the victim database. This determination may be made based on information which was first provided to the querying database in a discovery procedure such as procedure 800 described with respect to FIG. 8. For example, such discovery procedure may indicate or impose which band, channels, or locations for CRSs if any) that may require the querying database 1115 to forward spectrum requests to the victim database 1125. Thus if CRS 1105 falls in the geographical area which the victim database 1125 required a spectrum request to be made, then condition A in the FIG. 11 may hold, and the querying database 1115 may then need to obtain information from the victim database 1125 prior to any channel allocation for the CRS 1105. If the CRS 1105 does not fall within the region, band or other criteria where there may be harmful interference to incumbents managed by the victim database 1125, the assignment of operating parameters by the querying database 1115 may be made based solely on incumbent information regarding incumbents managed by the querying database 1115 (and without having to communicate with the victim database 1125).

In the spectrum request forwarding message 1130, the querying database may simply forward the same device parameters associated with the device or CRS 1105 (e.g. location, antenna height or other characteristics, spectrum mask, RAT, etc.) which were included in spectrum request 1110 to the victim database 1125. The victim database 1125 may then respond to the querying database 1115 with allowable channels and operating parameters (such as the maximum power) using the allowable spectrum response message 1135. This information, along with the protection information maintained by querying database 1115 for its own incumbents, may then be used by the querying database 1115 to define the actual allowable operating parameters for the CRS 1105 (both operating channels and maximum powers), which may be sent to the CRS 1105 in a spectrum response message 1145. The CRS 1105 may then select a subset of the allowable operating parameters and may indicate its actual operating parameters in a spectrum confirmation message 1150 to the querying database 1115. The querying database 1115 may then forward this same information indicating actual operating parameters of the CRS 1105 as received in the spectrum confirmation message 1150 to the victim database in a spectrum confirmation forwarding message 1155. Spectrum confirmation forwarding message 1155 may be forwarded to victim database 1125 in order for the victim database 1125 to handle the case of aggregated interference from CRSs both under its own management and the management of the querying database, if need be.

Although features and elements are described above in particular combinations, one of ordinary skill in the art will appreciate that each feature or element can be used alone or in any combination with the other features and elements.

It is noted that while certain implementations are discussed herein relating to management of spectrum used by CRS devices, spectrum used by other kinds of devices may also be managed. Further, while certain implementations are discussed herein relating to protection of incumbents, other types of devices may also be protected.

In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method for shared spectrum management implemented in a querying geolocation database (GLDB) server, the method comprising:
   selecting a potential victim GLDB server from a list of potential victim GLDB servers, the list comprising a subset of all GLDB servers accessible to the querying GLDB server;
   sending a query message to the potential victim GLDB server;
   receiving a query response message from the potential victim GLDB server indicating whether the potential victim GLDB server is an actual victim GLDB server.

2. The method of claim 1, wherein the query message includes spectrum information regarding intended spectrum usage at a given location by at least one device managed by the querying GLDB server.

3. The method of claim 1, wherein the query message includes device and operating parameters for available channels of at least one device managed by the querying GLDB server.

4. The method of claim 1, wherein the query response message indicates whether an incumbent protected by the potential victim GLDB server is within an interference range of devices managed by the querying GLDB server.

5. The method of claim 1, wherein the query response message indicates that a device managed by the querying GLDB server potentially interferes with an incumbent protected by the potential victim GLDB server.

6. The method of claim 1, wherein the query response message indicates that a device managed by the querying GLDB server and at least one other device may cumulatively interfere with an incumbent protected by the potential victim GLDB server.

7. The method of claim 1, further comprising modifying an operating parameter of a device managed by the querying GLDB server on a condition that the received query response message indicates that the potential victim GLDB server is an actual victim GLDB server.

8. The method of claim 1, further comprising:
   requesting interference information from the potential victim GLDB server regarding an incumbent managed by the actual victim GLDB server which may potentially receive interference from a device managed by the querying GLDB server;
   receiving the requested interference information from the potential victim GLDB server; and
   modifying an operating parameter of a device managed by the querying GLDB server based upon the received interference information to avoid interference with the incumbent managed by the potential victim GLDB server.

9. The method of claim 8, wherein the operating parameter comprises a channel, band, frequency, or spectrum.

10. The method of claim 1, further comprising:
    receiving a resource request from a device managed by the querying GLDB server;
    determining whether the resource request falls within a restriction;
    on a condition that the requested resource does not fall within the restriction, assigning at least one operating parameter to the device managed by the querying GLDB server; and
    on a condition that the requested resource falls within the restriction, sending a forwarding message based on the resource request to the potential victim GLDB server, receiving at least one allowable operating parameter from the potential victim GLDB server, and assigning at least one operating parameter to the device managed by the querying GLDB server based upon the at least one received allowable operating parameter.

11. A querying geolocation database (GLDB) server for shared spectrum management, comprising a processor, wherein the querying GLDB server is configured to:
    select a potential victim GLDB server from a list of potential victim GLDB servers, the list comprising a subset of all GLDB server accessible to the querying GLDB server;
    send, via transmitting circuitry, a query message to the potential victim GLDB server; and,
    receive, via receiving circuitry, a query response message from the potential victim GLDB server indicating whether the potential victim GLDB server is an actual victim GLDB server.

12. The GLDB server of claim 11, wherein the query message includes spectrum information regarding intended spectrum usage at a given location by at least one device managed by the querying GLDB server.

13. The GLDB server of claim 11, wherein the query message includes device and operating parameters for available channels of at least one device managed by the querying GLDB server.

14. The GLDB server of claim 11, wherein the query response message indicates whether an incumbent protected by the potential victim GLDB server is within an interference range of devices managed by the querying GLDB server.

15. The GLDB server of claim 11, wherein the query response message indicates that a device managed by the querying GLDB server potentially interferes with an incumbent protected by the potential victim GLDB server.

16. The GLDB server of claim 11, wherein the query response message indicates that a device managed by the querying GLDB server and at least one other device may cumulatively interfere with an incumbent protected by the potential victim GLDB server.

17. The GLDB server of claim 11, further comprising modifying an operating parameter of a device managed by the querying GLDB server on a condition that the received query response message indicates that the potential victim GLDB server is an actual victim GLDB server.

18. The GLDB server of claim 11, further comprising:
    requesting interference information from the potential victim GLDB server regarding an incumbent managed by the actual victim GLDB server which may potentially receive interference from a device managed by the querying GLDB server;

receiving the requested interference information from the potential victim GLDB server; and modifying an operating parameter of a device managed by the querying GLDB server based upon the received interference information to avoid interference with the incumbent managed by the potential victim GLDB server.

19. The GLDB server of claim 18, wherein the operating parameter comprises a channel, band, frequency, or spectrum.

20. The GLDB server of claim 11, further comprising:

receiving, via the receiving circuitry, a resource request from a device managed by the querying GLDB device;

determining whether the resource request falls within a restriction;

on a condition that the requested resource does not fall within the restriction, assigning at least one operating parameter to the device managed by the querying GLDB server; and on a condition that the requested resource falls within the restriction, sending a forwarding message based on the resource request to the potential victim GLDB server, receiving at least one allowable operating parameter from the potential victim GLDB server, and assigning at least one operating parameter to the device managed by the querying GLDB server based upon the at least one received allowable operating parameter.

\* \* \* \* \*